United States Patent
Lee et al.

(10) Patent No.: US 8,101,542 B2
(45) Date of Patent: Jan. 24, 2012

(54) CATALYST FOR OXIDIZING MONOXIDE AND METHOD OF PREPARING THE SAME

(75) Inventors: Hyun-chul Lee, Hwaseong-si (KR); Soon-ho Kim, Seoul (KR); Doo-hwan Lee, Suwon-si (KR); Eun-duck Park, Incheon (KR); Eun-yong Ko, Jeju-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 919 days.

(21) Appl. No.: 11/856,835

(22) Filed: Sep. 18, 2007

(65) Prior Publication Data

US 2008/0008926 A1    Jan. 10, 2008

Related U.S. Application Data

(63) Continuation-in-part of application No. 11/582,974, filed on Oct. 19, 2006, now abandoned.

(30) Foreign Application Priority Data

Oct. 21, 2005 (KR) .................. 2005-99620

(51) Int. Cl.
*B01J 23/40* (2006.01)
*B01J 23/42* (2006.01)
*B01J 23/44* (2006.01)
*H01M 8/06* (2006.01)
*C10K 3/04* (2006.01)

(52) U.S. Cl. ........ 502/326; 502/339; 429/412; 429/423; 423/247

(58) Field of Classification Search .................. 502/326, 502/339; 429/412, 423; 423/247
See application file for complete search history.

(56) References Cited

U.S. PATENT DOCUMENTS

| | | | |
|---|---|---|---|
| 6,548,447 B1 | 4/2003 | Yokoyama et al. | |
| 7,067,453 B1* | 6/2006 | Ming et al. | 502/304 |
| 2003/0054955 A1* | 3/2003 | Loewenstein | 502/326 |
| 2006/0174902 A1 | 8/2006 | Zhou et al. | |

FOREIGN PATENT DOCUMENTS

| | | |
|---|---|---|
| CN | 1321136 | 11/2001 |
| CN | 1414923 | 4/2003 |
| CN | 1428198 | 7/2003 |
| JP | 2001-149781 | 6/2001 |
| JP | 2002-210367 | 7/2002 |

(Continued)

OTHER PUBLICATIONS

U.S. Appl. No. 11/582,974, filed Oct. 19, 2006, Hyun-chul Lee et al., Samsung SDI Co., Ltd.

(Continued)

*Primary Examiner* — David M. Brunsman
*Assistant Examiner* — Kevin Johnson
(74) *Attorney, Agent, or Firm* — Lee & Morse, P.C.

(57) ABSTRACT

Provided are a catalyst for oxidizing carbon monoxide and a method of preparing the same. The catalyst for oxidizing carbon monoxide includes platinum and a transition metal which exists in a bimetallic phase, and the bimetallic phase of the platinum and the transition metal is supported by a support including a vacancy of oxygen. The catalyst for oxidizing carbon monoxide shows much higher activity than a conventional catalyst for oxidizing carbon monoxide even at a relatively low temperature.

8 Claims, 12 Drawing Sheets

FOREIGN PATENT DOCUMENTS

| | | |
|---|---|---|
| JP | 2003-275587 | 9/2003 |
| WO | WO 01/19727 | 3/2001 |
| WO | WO 01/47806 | 7/2001 |

OTHER PUBLICATIONS

Chinese Office Action dated Feb. 12, 2010, issued in corresponding Chinese Patent Application No. 2006101719652.

Chinese Office Action dated May 8, 2009 in corresponding Chinese Patent Application No. 2006101719652.

Japanese Office Action dated Oct. 6, 2009 in corresponding Japanese Patent Application No. 2006-287797.

Ryoo, Ryong et al., Preparation of nanosize Pt clusters using ion exchange of $Pt(NH_3)_4^{2+}$ inside mesoporous channel of MCM-41, 1996, Catalysis Letters, 37, pp. 29-33.

Chinese Decision of Final Rejection in CN 200610171965.2, dated Sep. 13, 2010 (Lee, et al.), Chinese Final Rejection Decision from prosecution of corresponding Chinese application.

* cited by examiner

CATALYST FOR OXIDIZING MONOXIDE AND METHOD OF PREPARING THE SAME

CROSS-REFERENCE TO RELATED PATENT APPLICATIONS

This application is a continuation-in-part application of U.S. patent application Ser. No. 11/582,974, filed on Oct. 19, 2006, now abandoned, and incorporated by reference herein.

FIELD OF THE INVENTION

The present invention relates to a catalyst for oxidizing carbon monoxide and a method of manufacturing the same, and more particularly, to a catalyst for oxidizing carbon monoxide having high reaction activity and excellent reaction selectivity in which a methanation reaction does not occur, and a method of manufacturing the same.

BACKGROUND

Fuel cells are electricity generation systems that directly convert the chemical energy of oxygen and the hydrogen in hydrocarbons such as methanol, ethanol, and natural gas to electrical energy.

Fuel cell systems consist of a fuel cell stack, a fuel processor (FP), a fuel tank, and a fuel pump. The fuel cell stack is the main body of a fuel cell, and includes several to several tens of unit cells, each including a membrane electrode assembly (MEA) and a separator (or bipolar plate).

The fuel pump supplies fuel in the fuel tank to the fuel processor. The fuel processor produces hydrogen by reforming and purifying the fuel and supplies the hydrogen to the fuel cell stack. The fuel cell stack receives the hydrogen and generates electrical energy by electrochemical reaction of the hydrogen with oxygen.

A reformer of the fuel processor reforms hydrocarbon fuel using a reforming catalyst. Since a hydrocarbon fuel typically contains one or more sulfur compounds, and since the reforming catalyst is easily poisoned by sulfur compounds, it is necessary to subject the hydrocarbon fuel to desulfurization prior to the reforming process in order to remove sulfur compounds prior to reforming the hydrocarbon fuel.

Figure 1:
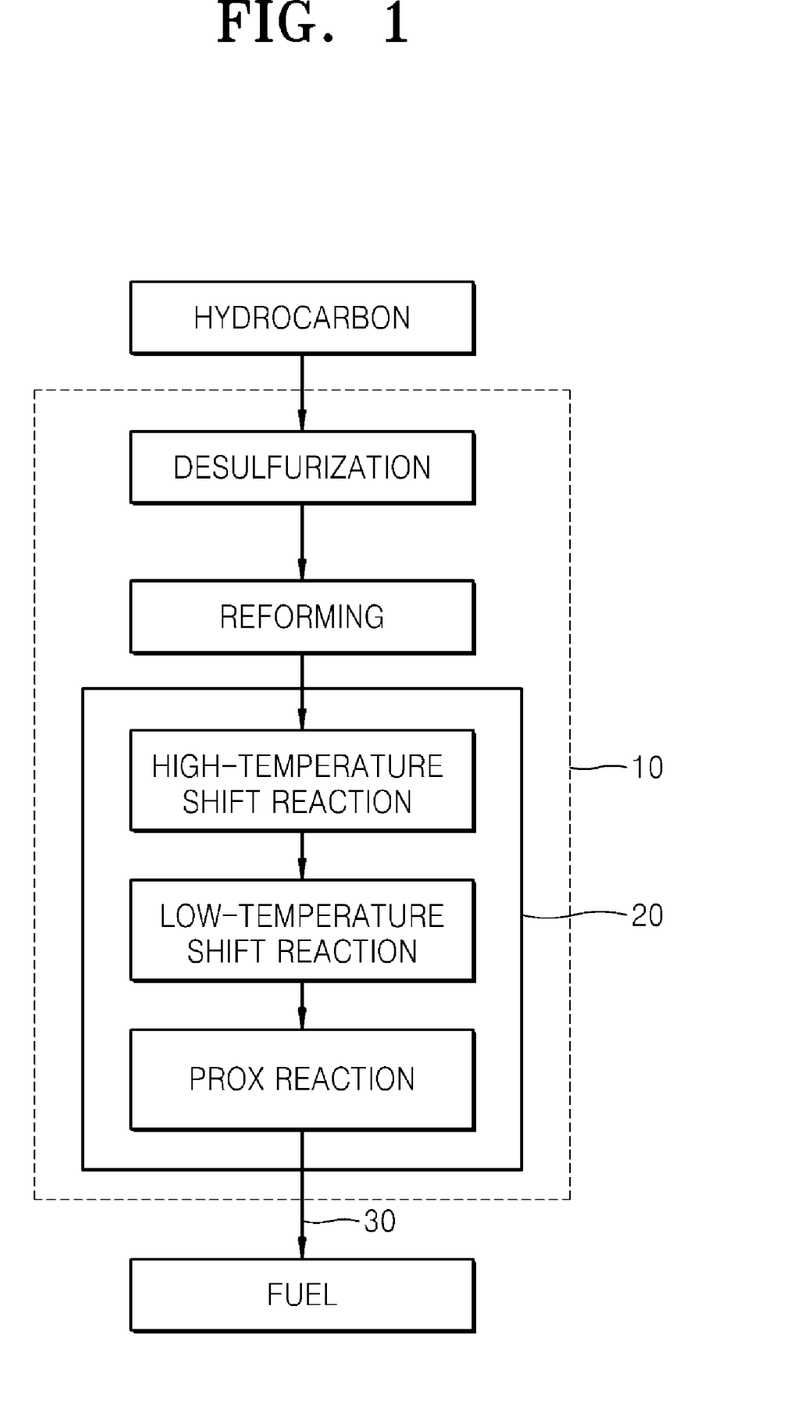
FIG. 1 is a schematic flow diagram illustrating fuel processing in a fuel processor used in a conventional fuel cell system.

FIG. 1 is a schematic flow diagram illustrating fuel processing in a fuel processor used in a conventional fuel cell system.

Hydrocarbon reforming produces carbon dioxide ($CO_2$) and a small amount of carbon monoxide (CO) as by-products, together with hydrogen. Since CO acts as a catalyst poison in electrodes of the fuel cell stack, reformed fuel should not be supplied to the fuel cell stack until a CO removal process has been carried out. It is desirable to reduce the CO levels to less than 10 ppm.

CO can be removed using a high-temperature shift reaction represented by Reaction Scheme 1 below.

<Reaction Scheme 1>

$$CO + H_2O \longrightarrow CO_2 + H_2$$

A high-temperature shift reaction is performed at a temperature of 400 to 500° C. Generally, a high-temperature shift reaction is followed by a low-temperature shift reaction at a temperature of 200 to 300° C. Even after these reactions are performed, it is very difficult to reduce the CO levels to less than 5,000 ppm.

To solve this problem, a preferential oxidation reaction (referred to as the "PROX" reaction) represented by Reaction Scheme 2 below can be used.

<Reaction Scheme 2>

$$CO + 1/2\, O_2 \longrightarrow CO_2$$

However, a side reaction represented by Reaction Scheme 3 occurs together with the PROX reaction.

<Reaction Scheme 3>

$$H_2 + 1/2\, O_2 \longrightarrow H_2O$$

Thus, in order to maintain a high level of $H_2$ while reducing CO, it is important to increase the rate of the PROX reaction represented by Reaction Scheme 2 and enhance the reaction selectivity for the PROX reaction by minimizing the side reaction represented by Reaction Scheme 3 as well.

Another serious potential problem is that a methanation reaction may occur between CO to be removed and reformed hydrogen, as represented by Reaction Scheme 4 below. It is important to inhibit this reaction since even limited methanation reactions can lead to a significant decrease in the hydrogen concentration and can affect the efficiency of the entire reforming process.

<Reaction Scheme 4>

$$CO + 3H_2 \longrightarrow CH_4 + H_2O$$

Conventional catalysts for oxidizing carbon monoxide in the PROX reaction have low reaction selectivity. Furthermore, when conventional catalysts are used, the methanation reaction partially occurs and the conventional catalysts lose reactivity by becoming reoxidized by oxygen in the reaction device during the catalytic operations or during intervals between operations.

Therefore, it is necessary to develop a PROX catalyst that has a high reaction activity, excellent reaction selectivity and a good reduction-oxidation property by re-reduction of oxidized catalyst and that does not support a methanation reaction.

SUMMARY OF THE INVENTION

The present invention provides a catalyst for oxidizing carbon monoxide having high reaction activity at low temperature and excellent reaction selectivity in which side reactions do not occur.

The present invention also provides a method of preparing a catalyst for oxidizing carbon monoxide.

The present invention also provides a fuel processor including a catalyst for oxidizing carbon monoxide having high reaction activity at low temperature and excellent reaction selectivity in which side reactions do not occur.

The present invention also provides a fuel cell system including a catalyst for oxidizing carbon monoxide having high reaction activity at low temperature and excellent reaction selectivity in which side reactions do not occur.

According to an aspect of the present invention, there is provided a catalyst for oxidizing carbon monoxide comprising platinum and a transition metal supported by a support comprising a vacancy of oxygen, wherein the platinum and the transition metal exist in a bimetallic phase.

According to another aspect of the present invention, there is provided a method of preparing a catalyst for oxidizing carbon monoxide, the method including: adding a precursor of platinum, a precursor of a transition metal, and a support comprising a vacancy of oxygen to a dispersion medium to obtain a homogeneous mixture; drying the mixture; calcining the dried product; and reducing the calcined product.

According to another aspect of the present invention, there is provided a fuel processor including the catalyst for oxidizing carbon monoxide.

According to another aspect of the present invention, there is provided a fuel cell system including the catalyst for oxidizing carbon monoxide.

The catalyst that oxidizes carbon monoxide according to aspects of the present invention has high activity in a carbon monoxide oxidizing reaction even at low temperature. In addition, efficiency of the entire reaction increases since side reactions such as a methanation reaction do not occur. Thus, the carbon monoxide in the fuel can effectively be eliminated using the catalyst according to aspects of the present invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A catalyst for oxidizing carbon monoxide according to an embodiment of the present invention includes platinum (Pt) and another transition metal supported by a support including a vacancy of oxygen, in which the Pt and another transition metal exist in a bimetallic phase. (For convenience, another transition metal is referred to herein simply as "the transition metal" and it is to be understood that the term "transition metal" in this context refers to a transition metal other than platinum.) The transition metal may be selected from the group consisting of nickel (Ni), cobalt (Co), copper (Cu), and iron (Fe). For example, the transition metal may be cobalt (Co).

The term "bimetallic phase of platinum and the transition metal" refers to a correlation between platinum and the transition metal that is created, for example, when platinum and the transition metal are loaded onto the support at the same time. The structural relationship between the platinum and the transition metal in the bimetallic phase is not clearly determined, but the bimetallic phase seems to have its own particular structure having reduction-oxidation cycles.

The atomic ratio of the transition metal to the platinum may be in the range from about 5 to about 20, specifically from about 10 to about 20. When the atomic ratio of the transition metal to the platinum is beyond this range, the CO conversion may be reduced.

The amount of the platinum may be in the range from about 0.2 wt % to about 1 wt %, preferably from about 0.5 wt % to about 1 wt % based on the total weight of the catalyst for oxidizing carbon monoxide. When the amount of the platinum is less than about 0.2 wt % of the catalyst for oxidizing carbon monoxide, the CO conversion may be reduced. On the other hand, when the amount of the platinum is greater than about 1 wt % of the catalyst for oxidizing carbon monoxide, the catalyst for oxidizing carbon monoxide may become expensive due to such a great amount of Pt.

It is presumed that the catalyst for oxidizing carbon monoxide according to the present invention can have excellent properties due to the support including a vacancy of oxygen. The support according to the present invention can be any support including an oxide that includes a vacancy of oxygen. Specifically, the support may be a single crystalline metal oxide or a polycrystalline metal oxide, in which the metal can be a transition metal or a non-transition metal. More specifically, the oxide can include an oxide of Group II element, an oxide of Group III element, an oxide of Group 4 element, and/or a mixture thereof. For example, the support can include $ZrO_2$, $CeO_2$, or $Ce_xZr_{1-x}O_2$ where $0<x<1$.

The support may be stabilized by a Group II element or a Group III element. Properties of the support may be variable according to a temperature change. When a Group II element or a Group III element is added to the support, properties of the support may become relatively less variable according to a temperature change.

The elements that may be added to provide stability to the support include, for example, yttrium(Y), calcium(Ca), magnesium(Mg), and/or lanthanum(La), but can also include other substances.

Specifically, the support may include yttrium stabilized $ZrO_2$(YSZ), calcium stabilized $ZrO_2$, magnesium stabilized $ZrO_2$, $Ce_xZr_{1-x}O_2$, yttrium stabilized $Ce_xZr_{1-x}O_2$, lanthanum stabilized $Ce_xZr_{1-x}O_2$ where $0<x<1$, lanthanum stabilized $CeO_2$, and/or a mixture thereof, but the support is not limited thereto.

Properties of the catalyst for oxidizing carbon monoxide can be identified using, for example, a temperature programmed reduction (TPR) analysis. The TPR analysis is performed by measuring an amount of a reducing substance consumed at each temperature in a reducing condition while the temperature is increased. The catalyst for oxidizing carbon monoxide according to the present invention can show at least two peaks at about 260° C. or lower and the reducing reaction of the catalyst can be completed at a temperature lower than about 260° C. (533K) when the TPR analysis is performed at a ramping rate of 10 K/min in an atmosphere of a reducing gas of 10 vol % $H_2$/Ar.

A method of preparing a catalyst for oxidizing carbon monoxide will now be described in detail.

First, a precursor of platinum, a precursor of a transition metal, and a support including a vacancy of oxygen are added to a dispersion medium and then homogeneously mixed together. The precursor of platinum can include halides, such as chloride, of platinum; ammonium halides, such as ammonium chloride, of platinum; nitrate of platinum; ammonium nitrate of platinum; and/or a mixture thereof. The precursor of platinum, however, is not limited thereto. The precursor of a transition metal can include halides, such as chloride, of the transition metal; ammonium halides, such as ammonium chloride, of the transition metal; nitrate of the transition metal; ammonium nitrate of the transition metal; and/or a mixture thereof. The precursor of a transition metal, however, is not limited thereto.

The homogenously mixing process is not specifically limited. For example, the homogenously mixing process can be performed by stirring for about one hour to about 12 hours at a temperature in the range from about 40° C. to about 80° C.

Herein, the dispersion medium is so named since although the platinum precursor and the transition metal precursor are dissolved in the medium, the γ-alumina support is not dissolved, but rather, is only dispersed.

The dispersion medium can be any substance that can dissolve the precursor of platinum and the precursor of a transition metal and disperse that support. For example, the dispersion medium can be water or an alcohol-based liquid. Specifically, the alcohol-based liquid may be methanol, ethanol, isopropylalcohol, butylalcohol, or the like, but is not limited thereto.

The weight ratio of the precursor of the transition metal to the precursor of platinum may be controlled such that an atomic ratio of the transition metal to the platinum is in the range from about 5 to about 20, specifically, about 10 to about 20, as described above.

The amount of the dispersion medium is not limited, and may be in the range from about 30 wt % to about 95 wt % of the entire mixture so as to efficiently disperse the precursor of platinum, the precursor of a transition metal, and the support including a vacancy of oxygen.

The resultant mixture is dried to remove the dispersion medium. The drying process is not specifically limited. For example, the drying process can be performed at a temperature in the range from about 30° C. to about 90° C. for about 1 hour to about 16 hours. The drying process can be performed in a vacuum condition and/or in a heating condition, such as in an oven. Optionally, the mixed product can be filtered and then only the filtrate may be dried.

Through the drying process, the dispersion medium, such as water or an alcohol-based solvent can be removed. The dried product is then calcined in a closed heating space, such as in an oven.

The calcining process can be performed at a temperature in the range from about 200° C. to about 550° C. for about 1 hour to about 12 hours. When the calcining temperature is less than about 200° C., the crystal structure of the catalyst may be insufficiently formed. On the other hand, when the calcining temperature is higher than about 550° C., the supported metal may grow excessively and the reaction activity of the catalyst may be reduced. Specifically, when the calcining temperature increases up to 700° C., the transition metal may encapsulate a platinum-transition metal bimetallic phase so that unique effects of the platinum-transition metal existing in a bimetallic phase may substantially deteriorate.

When the calcining time is smaller than about 1 hour, the crystal structure of the catalyst may be insufficiently formed. On the other hand, when the calcining time is greater than about 12 hours, the method of preparing the catalyst becomes expensive due to excessive calcining time. The calcining process can be performed in any kind of condition, such as in an atmospheric condition.

After the calcining process, the calcined product is reduced to obtain a catalyst for oxidizing carbon monoxide.

The reduction may be performed at a temperature in the range from about 200° C. to about 550° C. for about 1 hour to about 12 hours. When the reducing temperature is lower than about 200° C., the bimetal phase of the catalyst may be insufficiently formed. On the other hand, when the reducing temperature is higher than about 550° C., the supported metal may excessively grow so that the reactivity of the catalyst may be reduced.

The reduction may be performed in a reducing atmosphere, for example, including hydrogen. Optionally, the reducing atmosphere may further include an inert gas, such as helium, nitrogen, neon, or argon.

Figure 2:
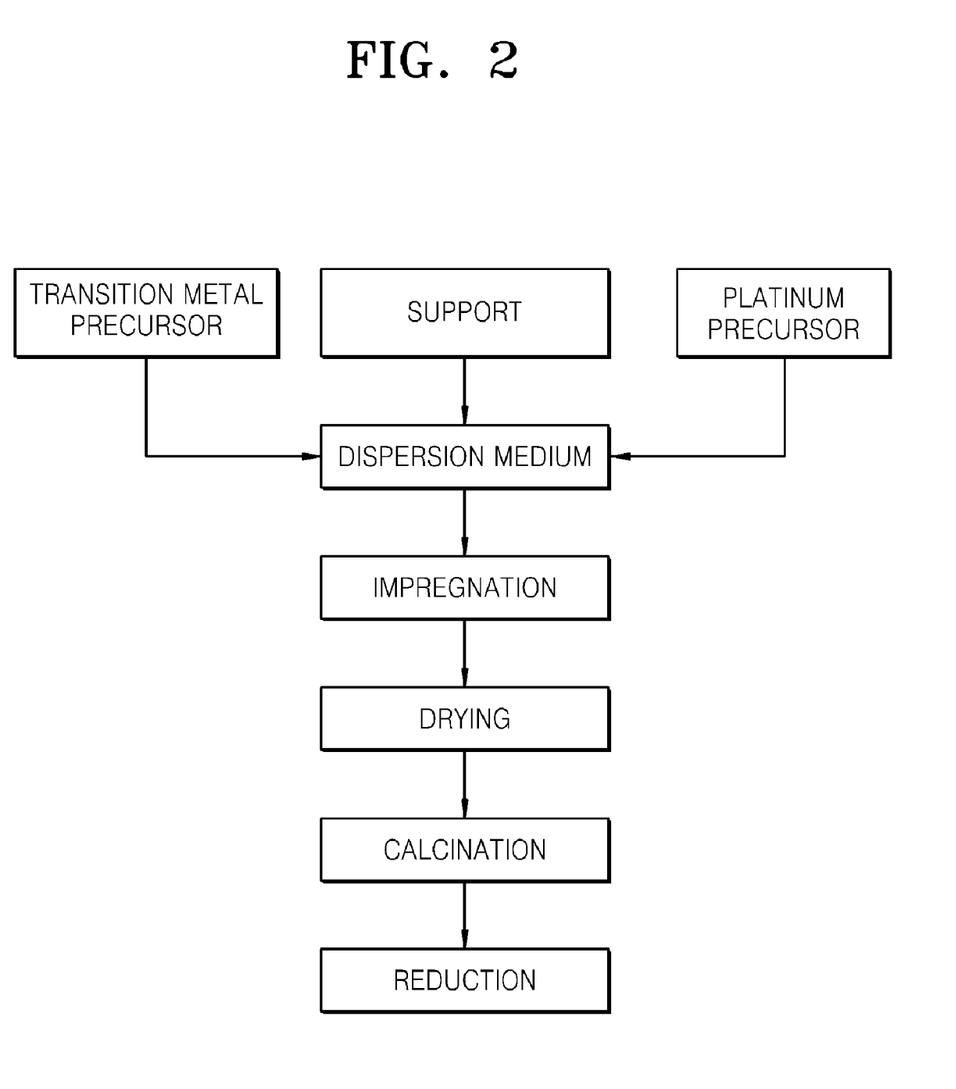
FIG. 2 is a flowchart illustrating a method of manufacturing a catalyst for oxidizing carbon monoxide according to an embodiment of the present invention.

The method of preparing a catalyst for oxidizing carbon monoxide according to an embodiment of the present invention described above is illustrated in FIG. 2.

According to an embodiment of the present invention, a fuel processor including the catalyst for oxidizing carbon monoxide is provided. Hereinafter, the fuel processor will be described.

The fuel processor may include a desulfurizer, a reformer, a high-temperature shift reaction device, a low-temperature shift reaction device, and a PROX reaction device.

The desulfurizer is a device that removes sulfur compounds that can poison catalysts downstream from the desulfurizer. An absorbent that is well known in the art may be used for the desulfurizer, and a hydrodesulfurization (HDS) process may also be used.

The reformer is a device that reforms hydrocarbons to produce hydrogen. Any catalyst such as platinum, ruthenium, and nickel that is well known in the art may be used for the reforming catalyst.

The high-temperature shift reaction device and the low-temperature shift reaction device are devices that remove carbon monoxide, which can poison the catalyst layer of a fuel cell. Typically, the high-temperature shift reaction device and the low-temperature shift reaction device reduce the carbon monoxide concentration to less than 1%.

The PROX reaction device further reduces the carbon monoxide concentration to less than 10 ppm. According to an embodiment of the present invention, the PROX reaction device may include the catalyst for oxidizing carbon monoxide as described herein. For example, the catalyst for oxidizing carbon monoxide may be charged in the PROX reaction device as a fixed bed.

According to an embodiment of the present invention, a fuel cell system including the catalyst for oxidizing carbon monoxide is provided.

The fuel cell system according to the embodiment of the present invention includes a fuel processor and a fuel cell stack. The fuel cell processor may include a desulfurizer, a reformer, a high-temperature shift reaction device, a low-temperature shift reaction device, and a PROX reaction device as described above. The fuel cell stack may be formed by stacking or arranging a plurality of unit cells. Each of the unit cells may include a cathode, an anode, and an electrolyte membrane, and may further include a separator.

The catalyst for oxidizing carbon monoxide may be included in the fuel cell processor, and more specifically, in the PROX reaction device.

Hereinafter, the constitution and effects of aspects of the present invention will be described more specifically with reference to the following Examples and Comparative Examples. The following examples are for illustrative purposes only and are not intended to limit the scope of the invention.

EXAMPLE 1

0.207 g of $Pt(NH_3)_4(NO_3)_2$, 1.554 g of $Co(NO_3)_2$, and 10 g of yttrium stabilized $ZrO_2$ (YSZ) were added to 50 mL of water and then stirred for six hours to obtain a homogeneous mixture. The solvent used was removed from the mixture at 60° C. under reduced pressure and then, dried in an oven at 110° C. for 12 hours. Then, the dried product was calcined at 300° C. for two hours in atmospheric condition. The calcined product was reduced in an oven in a hydrogen atmosphere at 300° C. for 2 hours to obtain Pt—Co/YSZ. In the obtained catalyst, an atomic ratio of Co/Pt was 10, and the amount of platinum was 1 wt % based on total weight of the catalyst for oxidizing carbon monoxide.

COMPARATIVE EXAMPLES 1 TO 3

Supported catalysts were prepared in the same manner as in Example 1, except that 10 g of $\gamma$-$Al_2O_3$, 10 g of $TiO_2$, and 10 g of $SiO_2$ were used instead of 10 g of YSZ, respectively.

Figure 3:
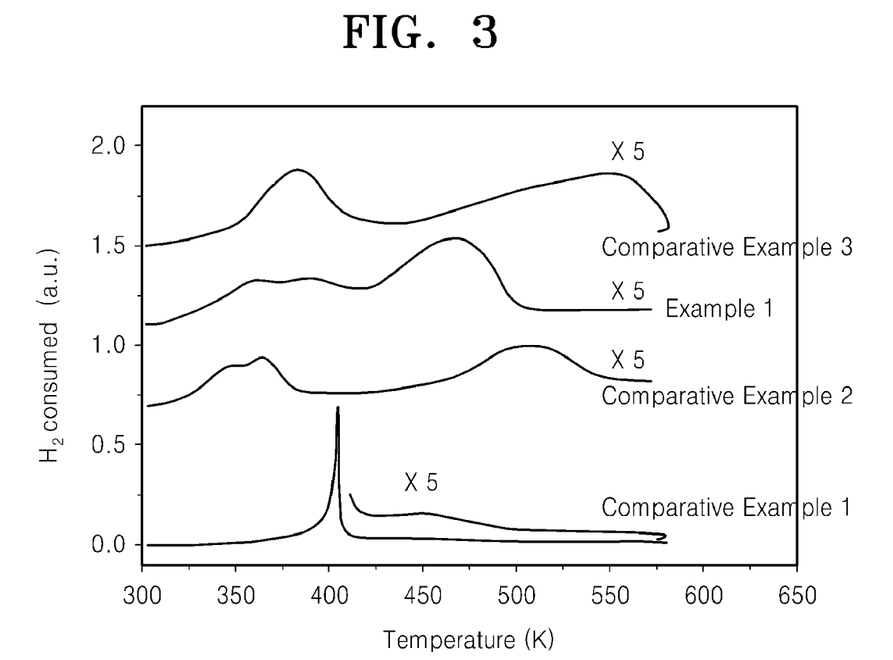
FIG. 3 is a graph illustrating the result of a TPR analysis of Pt—Co supported catalysts according to Example 1 and Comparative Examples 1 to 3.

The supported catalysts prepared according to Example 1 and Comparative Examples 1 to 3 were TPR analyzed. The TPR analysis was performed at a ramping rate of 10 K/min in a 10 volume % H2/Ar and the results are shown in FIG. 3. Referring to FIG. 3, in the case of the Pt—Co catalyst supported by an YSZ support, it can be seen that there are three peaks and that the reducing reaction is completed at a temperature of about 500 K. However, in the case of the supported catalysts prepared according to Comparative Examples 1 to 3, it can be seen that hydrogen is continuously consumed at 500 K or higher, and thus, that the reducing reaction continues.

Figure 4:
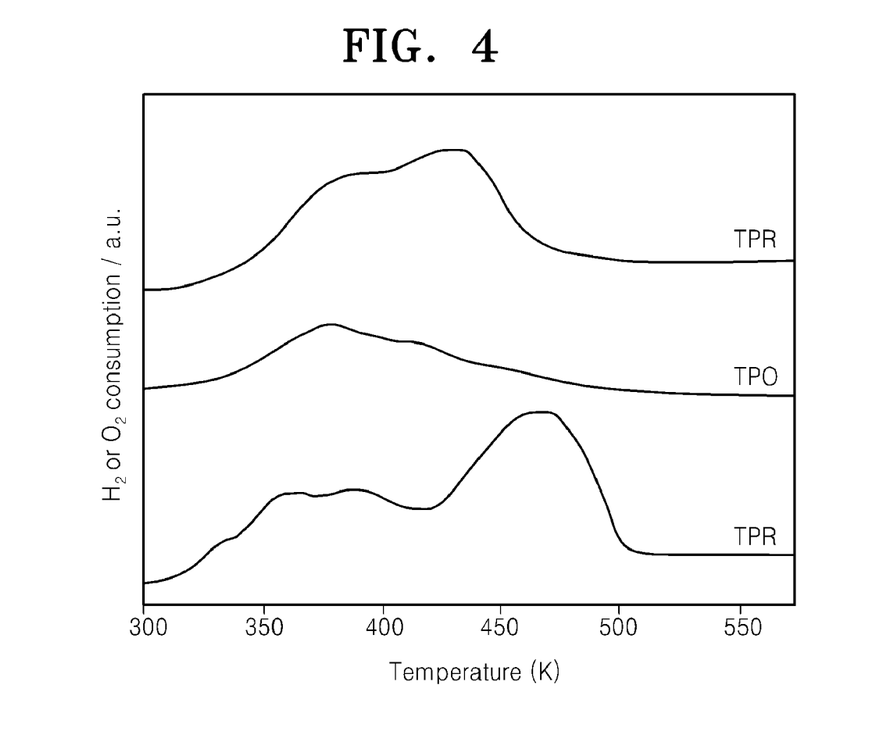
FIG. 4 is a graph illustrating the result of a TPR-TPO-TPR analysis of a Pt—Co supported catalyst according to Example 1.

The TPR analysis was performed on the catalyst prepared according to Example 1 and then, a TPO analysis which was used to measure the amount of oxygen consumed was performed while oxygen was fed and the temperature was increased. Then, the TPR was performed again. The TPO analysis was performed at a ramping rate of 10 K/min while air was fed. As a result, it was found that the catalyst prepared according to Example 1 was reduced and then oxidized, but in a hydrogen atmosphere, the supported catalyst was easily reduced again as illustrated in FIG. 4.

Figure 5A:
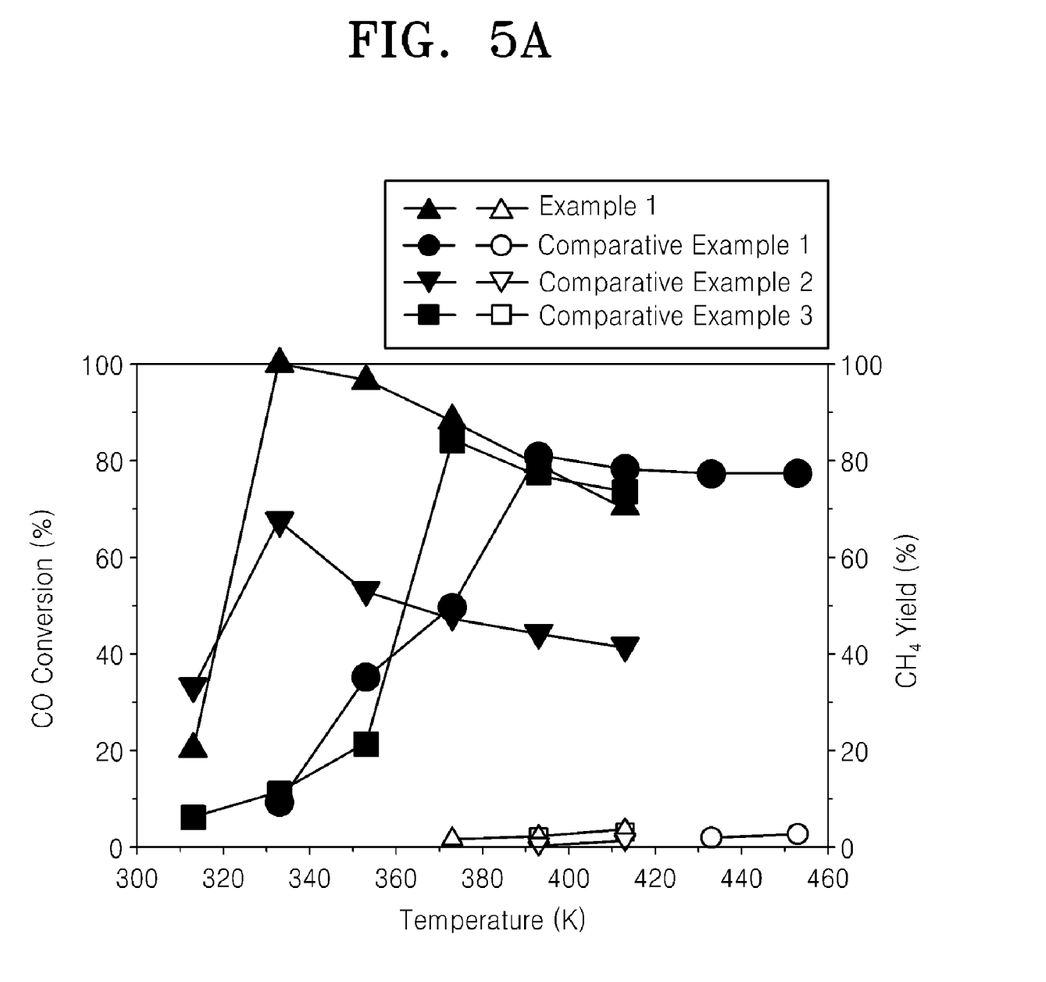
FIGS. 5A and 5B are graphs respectively illustrating the results of CO oxidizing tests of Pt—Co supported catalysts according to Example 1 and Comparative Examples 1 to 3.
Figure 5B:
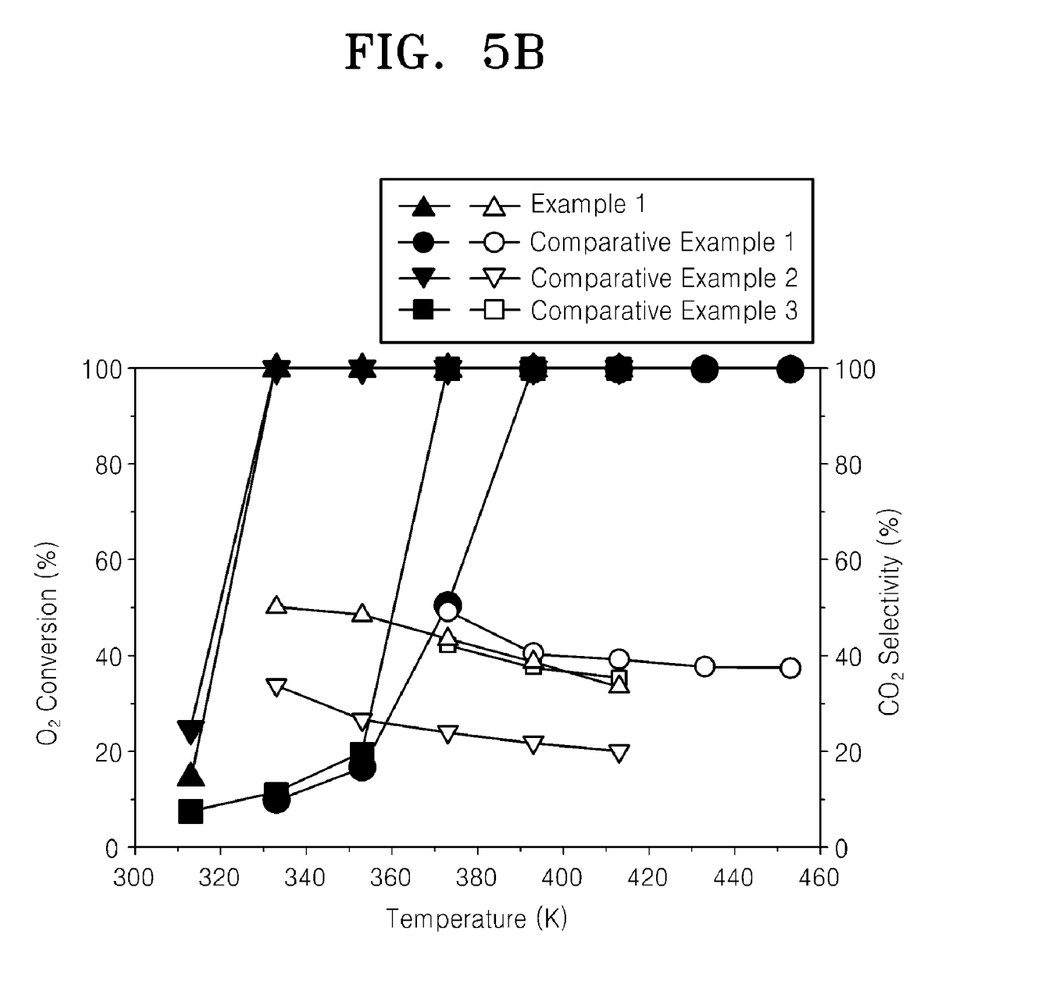

A test for identifying oxidizing properties of carbon monoxide was performed on each catalyst. Each of the supported catalysts was loaded to a reactor and then a feed gas consisting of 1% CO, 1% $O_2$, 80% $H_2$, 2% $H_2O$, and the balance of He was supplied at a GHSV of 60,000 $hr^{-1}$ to measure the CO conversion, the $CH_4$ yield, the $O_2$ conversion, and the $CO_2$ selectivity. The results are shown in FIGS. 5A and 5B. In FIGS. 5A and 5B, solid marks refer to the left vertical axis and hollow marks refer to the right vertical axis.

Referring to FIG. 5A, the supported catalyst using the YSZ support prepared according to Example 1 showed a higher CO conversion than the supported catalysts prepared according to Comparative Examples 1 through 3, and specifically, the higher CO conversion was obtained at a temperature of a relatively low temperature, that is, about 330 K. Therefore, it can be seen that the supported catalyst prepared according to Example 1 can be easily used and applied.

Referring to FIG. 5B, the supported catalyst prepared according to Example 1 showed a higher $O_2$ conversion and a higher $CO_2$ selectivity than the supported catalysts prepared according to Comparative Examples 1 through 3.

EXAMPLES 2 TO 4 AND COMPARATIVE EXAMPLE 4

Pt—Co/YSZ or Pt/YSZ-supported catalysts were prepared in the same manner as in Example 1, except that the amounts of $Pt(NH_3)_4(NO_3)_2$, $Co(NO_3)_2$ and YSZ(Yttrium Stabilized $ZrO_2$) were varied according to Table 1 to identify a change in the CO conversion, the $CH_4$ yield, the $O_2$ conversion, and the $CO_2$ selectivity with respect to the platinum content and atomic ratio of Co/Pt of the catalyst for oxidizing carbon monoxide.

TABLE 1

| Example | $Pt(NH_3)_4(NO_3)_2$ | $Co(NO_3)_2$ | YSZ | Co/Pt | Pt content (wt %) |
|---|---|---|---|---|---|
| Example 2 | 0.103 g | 1.546 g | 10 g | 20 | 0.5 |
| Example 3 | 0.101 g | 0.387 g | 10 g | 5 | 0.5 |
| Example 4 | 0.041 g | 1.541 g | 10 g | 50 | 0.2 |
| Comparative Example 4 | 0.200 g | 0 g | 10 g | 0 | 1 |

Figure 6A:
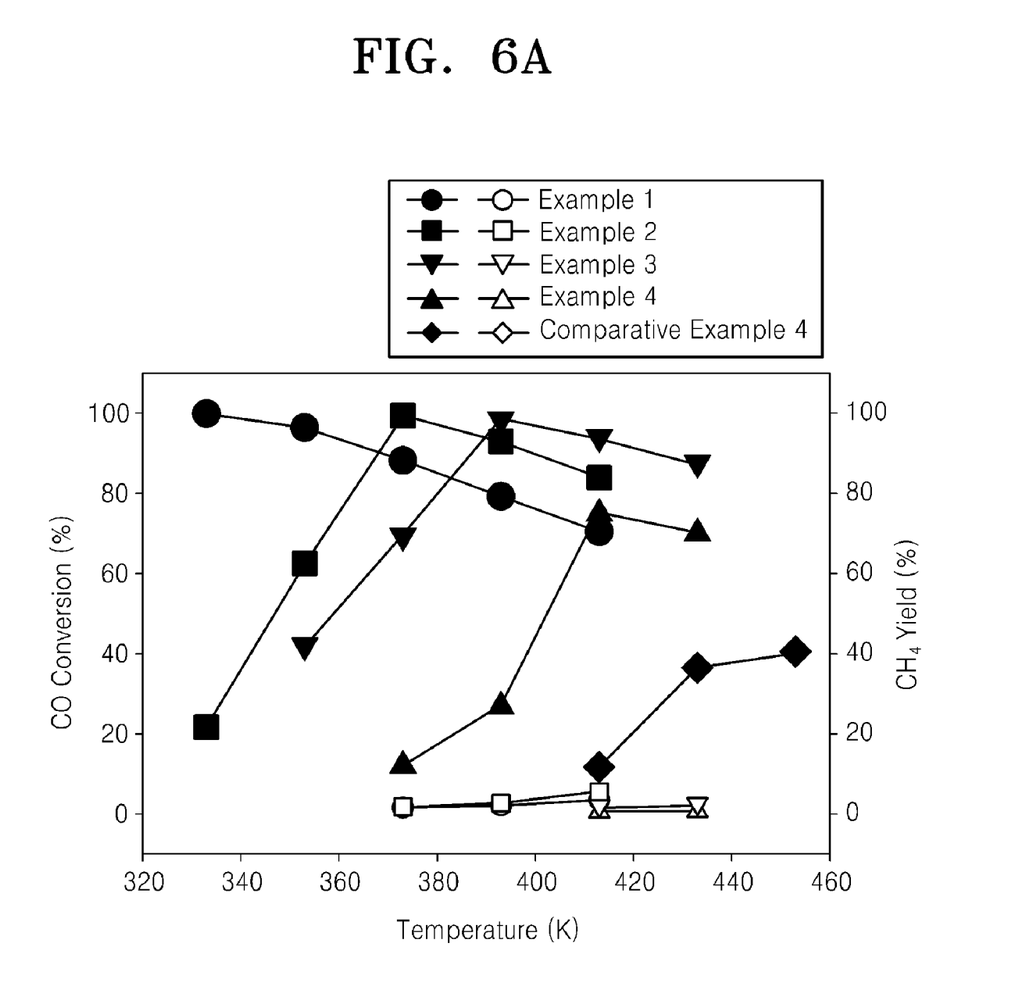
FIGS. 6A and 6B are graphs respectively illustrating the results of CO oxidizing tests of a CO oxidizing catalysts according to Examples 1 to 4 and Comparative Example 4.
Figure 6B:
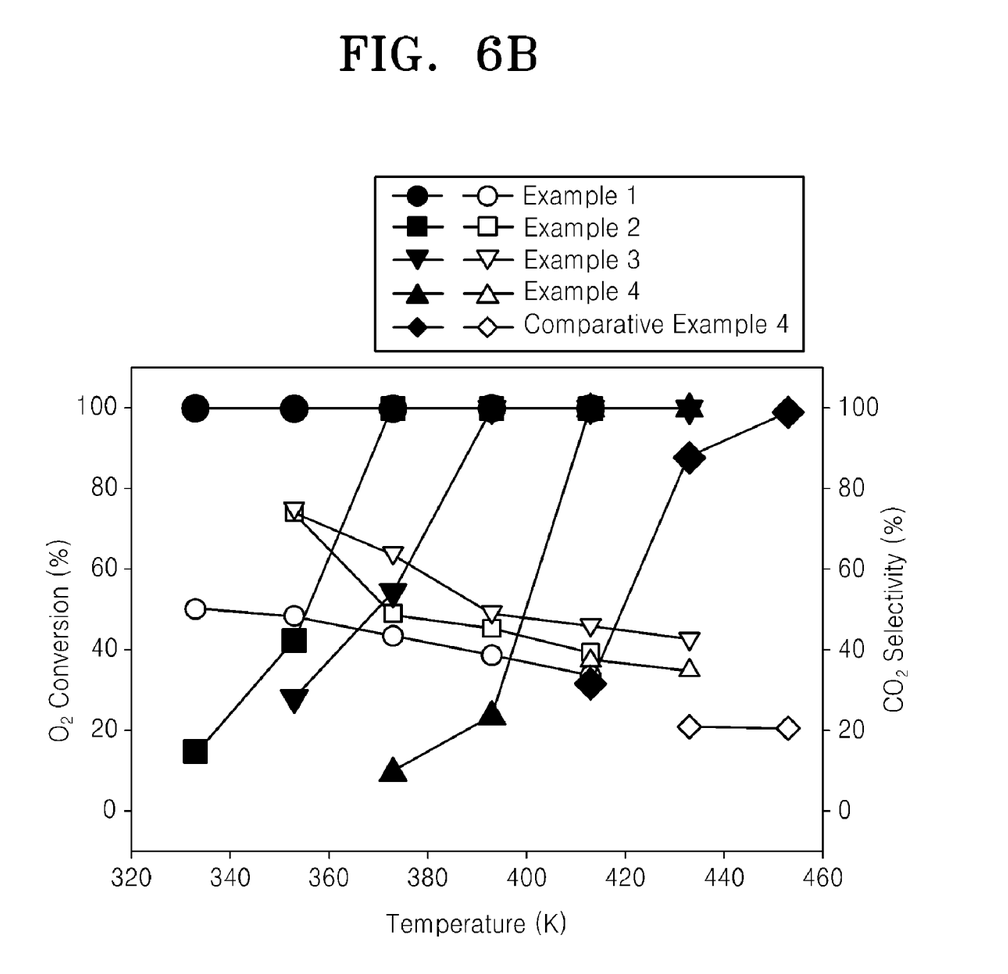

A test for identifying oxidizing properties of carbon monoxide was performed on the supported catalysts prepared according to Examples 1 to 4 and Comparative Example 4. Each of the supported catalysts was loaded to a reactor, and then a feed gas consisting of 1% CO, 1% $O_2$, 80% $H_2$, 2% $H_2O$, and the balance of He was supplied at a GHSV of 60,000 $hr^{-1}$ to measure the CO conversion, the $CH_4$ yield, the $O_2$ conversion, and the $CO_2$ selectivity. The results are shown in FIGS. 6A and 6B. In FIGS. 6A and 6B, solid marks refer to the left vertical axis and hollow marks refer to the right vertical axis.

Referring to 6A, the supported catalyst including Co and Pt in an atomic ratio of about 5 to about 20 showed almost 100% of the CO conversion. Specifically, the supported catalyst including Co and Pt in an atomic ratio of about 10 to about 20 showed almost 100% of the CO conversion at a relatively low temperature. In addition, the supported catalyst showed excellent reaction properties when the amount of platinum was in the range from about 0.2 wt % to about 1 wt %, preferably from about 0.5 wt % to about 1 wt % of the catalyst for oxidizing carbon monoxide. Meanwhile, the supported catalysts prepared according to Comparative Example 4 in which an atomic ratio of Co/Pt was beyond this range described above showed poor reaction properties.

Referring to FIG. 6B, the supported catalysts prepared according to Examples 1 to 4 showed higher $O_2$ conversion and $CO_2$ selectivity than the supported catalysts prepared according to Comparative Example 4.

EXAMPLES 5 AND 6

Catalysts for oxidizing carbon monoxide were prepared in the same manner as in Example 3 except that the calcining temperature and the reducing temperature were changed. Specifically, Example 5 was performed at the calcining temperature of 500° C. and the reducing temperature of 500° C., and Example 6 was performed at the calcining temperature of 700° C. and the reducing temperature of 500° C.

Figure 7A:
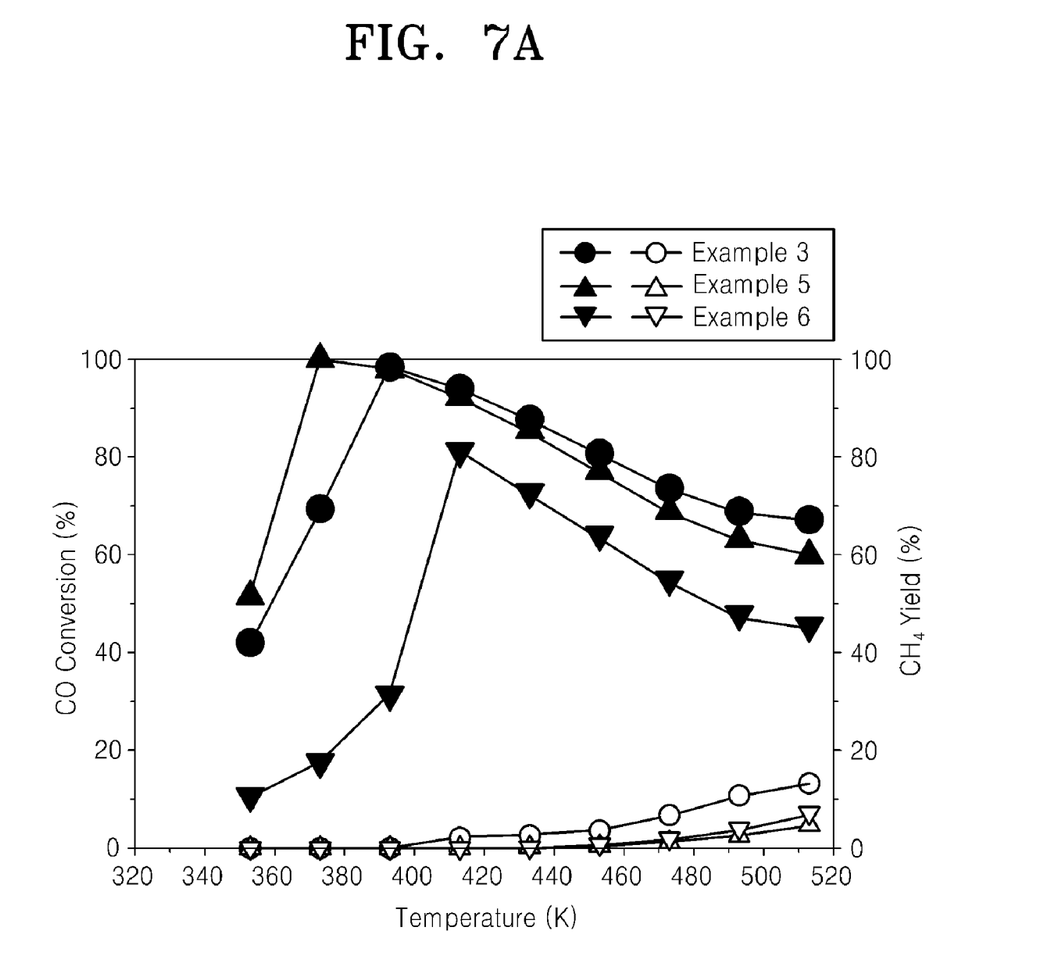
FIGS. 7A and 7B are graphs respectively illustrating the results of CO oxidizing tests of a CO oxidizing catalysts according to Examples 3, 5 and 6.
Figure 7B:
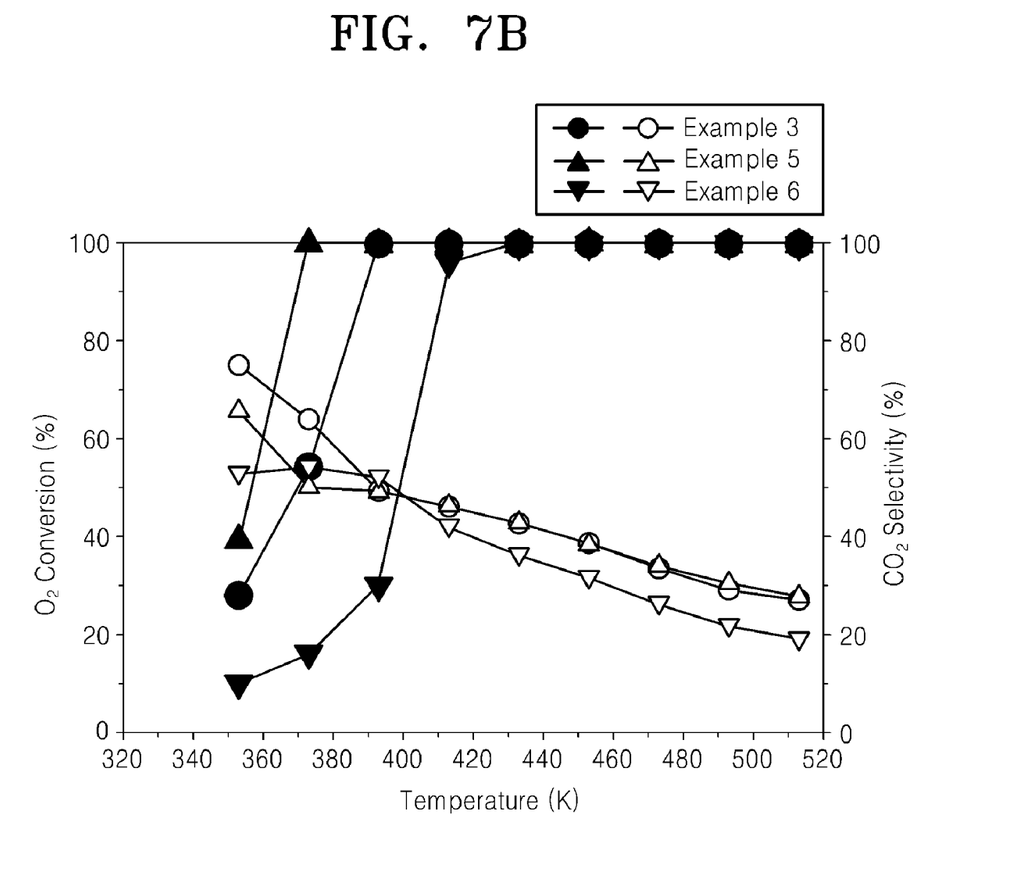

Tests for identifying oxidizing properties of carbon monoxide were performed on the supported catalysts prepared according to Examples 3, 5 and 6. Each of the supported catalysts was loaded to a reactor, and then a feed gas consisting of 1% CO, 1% $O_2$, 80% $H_2$, 2% $H_2O$, and the balance of He was supplied at a GHSV of 60,000 $hr^{-1}$ to measure the CO conversion, the $CH_4$ yield, the $O_2$ conversion, and the $CO_2$ selectivity. The results are shown in FIGS. 7A and 7B. In FIGS. 7A and 7B, solid marks refer to the left vertical axis and hollow marks refer to the right vertical axis.

Referring to FIG. 7A, the supported catalyst prepared according to Examples 3 in which the calcination and reduction were performed at 300° C. and the supported catalyst prepared according to Examples 5 in which the calcination and reduction were performed at 500° C. showed relatively high CO conversion, on the other hand, the supported catalyst prepared according to Examples 6 in which the calcination was performed at 700° C. showed relatively low CO conversion. The supported catalyst prepared according to Example 3 showed high $CH_4$ yield, so it was identified that a methanation reaction, which is an undesired side reaction, occurred relatively actively. On the other hand, the supported catalyst prepared according to Examples 5 in which the calcination and reduction were performed at 500° C. showed high CO conversion and low $CH_4$ yield. Accordingly, it can be seen that the calcining and reducing temperatures may be in the range from 200° C. to 550° C., specifically in the vicinity of 500° C.

Referring to FIG. 7B, the supported catalyst prepared according to Examples 5 showed high $O_2$ conversion and high $CO_2$ selectivity.

COMPARATIVE EXAMPLE 5

A Co/YSZ supported catalyst was prepared in the same manner as in Comparative Example 4, except that 1.554 g of $Co(NO_3)_2$ was used instead of $Pt(NH_3)_4(NO_3)_2$.

Figure 8:
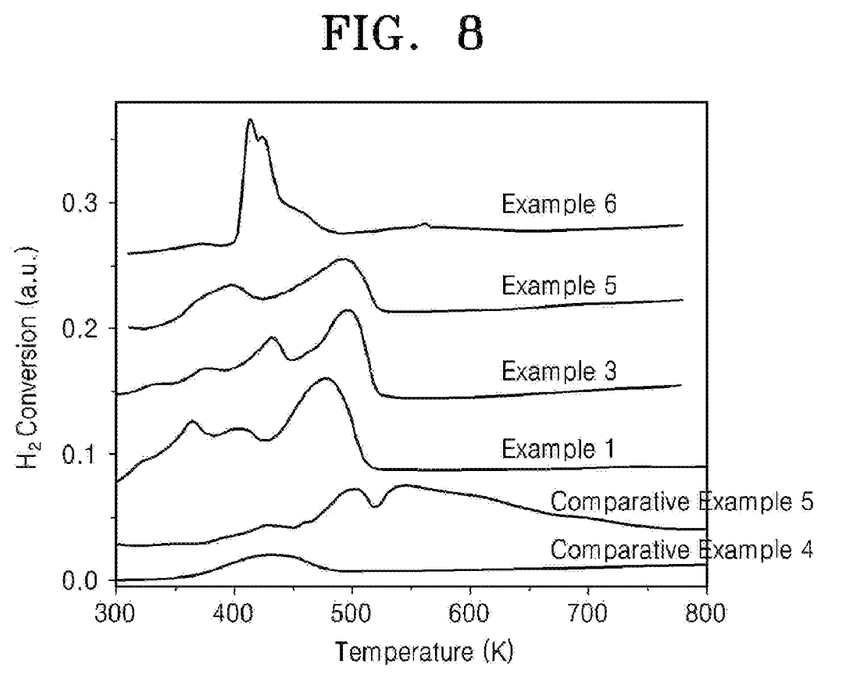
FIG. 8 is a graph illustrating the results a TPR analysis of a CO oxidizing catalysts according to Examples 1, 3, 5 and 6, and Comparative Examples 4 and 5.

The TPR analysis was performed using the supported catalysts prepared according to Examples 1, 3, 5, and 6 and Comparative Examples 4 and 5. The results are shown in FIG. 8. The TPR analysis was performed at a ramping rate of 10 K/min in a feed composition condition of 10 vol % $H_2$/Ar.

Referring to FIG. 8, in the case of the supported catalysts prepared according to Examples 1, 3, 5 and 6, there are at least two peaks at 260° C. (533K) or lower and the reducing reaction is complete; in the case of the supported catalyst prepared according to Example 6, there were at least two peaks but they considerably overlap; and in the case of the supported catalysts prepared according to Comparative Examples 4 and 5, there was only one peak and/or the reduction continued above 260° C.

To identify how the respective metal catalysts exist on the support, a transmission electron microscopy (TEM) analysis was performed on the surfaces of the supported catalysts prepared according to Examples 3, 5 and 6. The results are shown in FIGS. 9A through 9C.

Figure 9A:
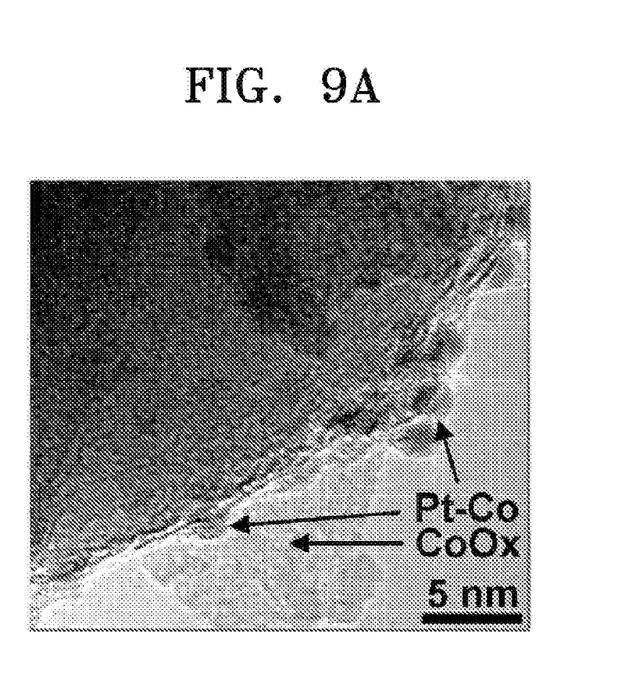
FIGS. 9A to 9C illustrate TEM photograph images regarding the Pt—Co/YSZ according to Examples 3, 5 and 6.
Figure 9B:
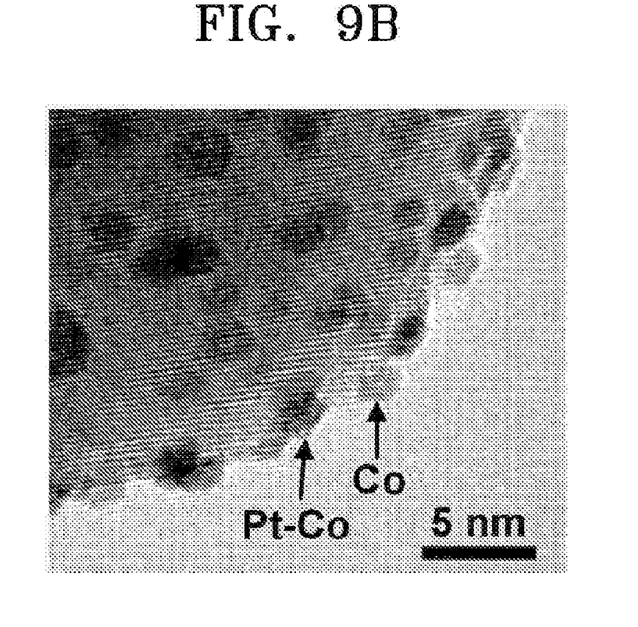
Figure 9C:
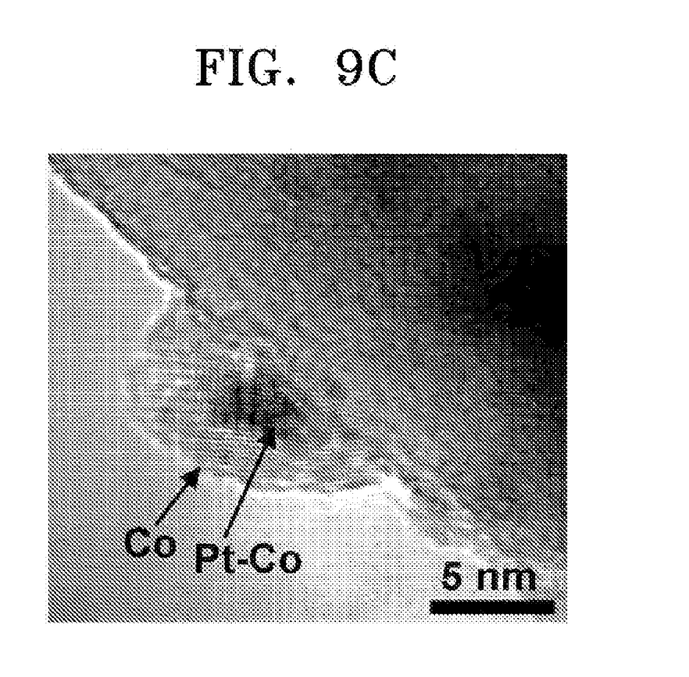

Referring to FIG. 9A showing the case of the supported catalyst prepared according to Example 3, Pt—Co in a bimetallic phase dispersively exists on the surface of the support, but non-reduced cobalt oxide also partly exists on a surface of the support. Referring to FIG. 9B showing the case of the supported catalyst prepared according to Example 5, Pt—Co in a bimetallic phase is uniformly dispersed and exists on the surface of the support, and Co is also uniformly dispersed and exists on the surface of the support. Referring to FIG. 9C showing the case of the supported catalyst prepared according to Example 6, there is a Pt—Co in a bimetallic phase but some of the Pt—Co in a bimetallic phase was encapsulated by cobalt. Therefore it can be seen that these the Pt—Co can hardly act as a catalyst. Accordingly, it can be seen that the supported catalyst prepared according to Example 6 showed relatively lower activity than the supported catalysts prepared according to Examples 3 and 5 for this reason.

A test for identifying a CO removing property of the supported catalyst prepared according to Example 5 was performed. The supported catalyst was loaded to a reactor, and then a feed gas consisting of 0.9 vol % CO, 0.9 vol % $O_2$, 17.4 vol % $CO_2$, 64.6 vol % $H_2$, 13 vol % $H_2O$, and the balance of $N_2$ was supplied at a GHSV of 9,000 $hr^{-1}$ to measure concentrations of CO, $CO_2$, and $H_2$. The results are shown in FIG. 10.

Figure 10:
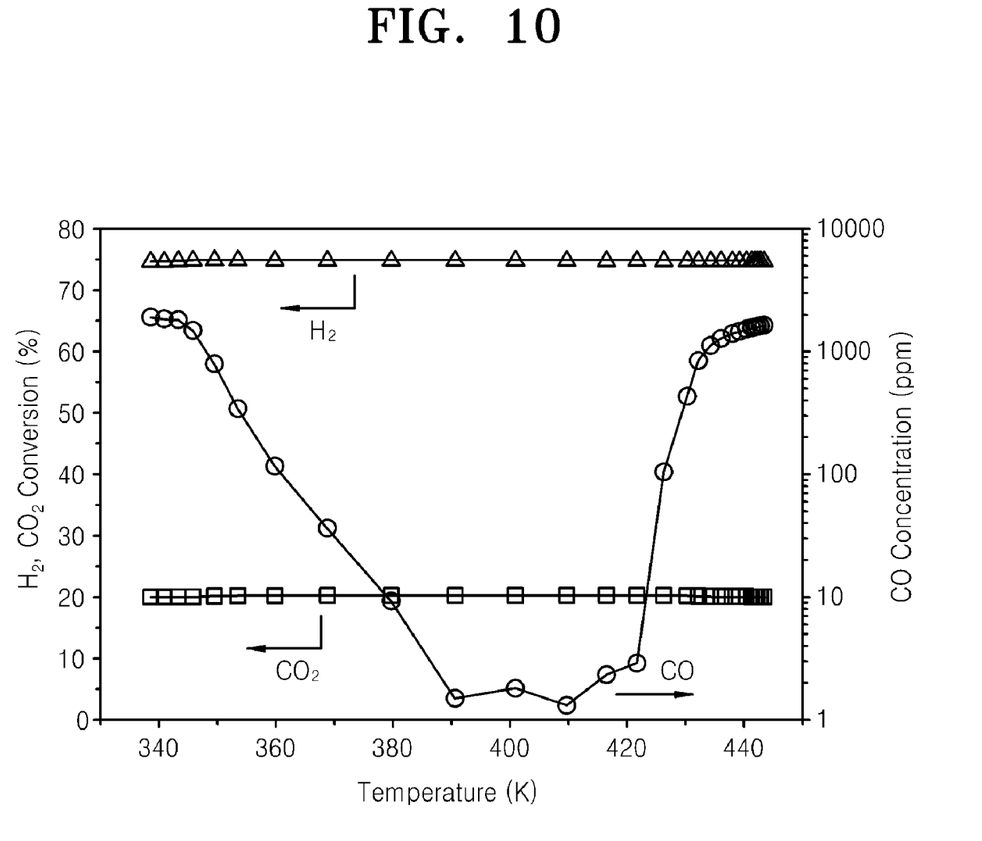
FIG. 10 illustrates graph of $H_2$, $CO_2$ and CO concentration regarding the supported catalyst of Example 5.

Referring to FIG. 10, the concentration of carbon monoxide was less than 10 ppm at a temperature of about 380K to 425 K. In consideration that the concentration of CO in the feed gas is 0.9 vol % (9,000 ppm), such a low concentration indicates conversion of about 99.9% or more. Accordingly, it can be seen that an optimal operating temperature of a reactor using the catalyst for oxidizing carbon monoxide prepared according to Example 5 is in the range from 380K to 425 K.

To measure the amount of a surface active site of the supported catalysts prepared, carbon monoxide was chemisorbed onto the supported catalysts prepared according to Examples 1, 3, 5, 6 and Comparative Example 4. 0.2 g of each of the supported catalysts was loaded in a He stream of 300K and then 50 μl of CO was chemisorbed thereto through pulsed injection. Then, the amount of CO chemisorbed was measured. The results are shown in Table 2.

TABLE 2

| Catalyst | | Pretreatment (Calcination/ Reduction) | Amount of CO chemisorbed (CO μmol/$g_{cat}$) |
|---|---|---|---|
| Example 3 | Pt—Co/YSZ | (300° C./300° C.) | 8.78 |
| Example 5 | (0.5 wt % Pt, Co/Pt = 5) | (500° C./500° C.) | 8.13 |
| Example 6 | | (700° C./500° C.) | 3.34 |
| Example 1 | Pt—Co/YSZ (1 wt % Pt, Co/Pt = 10) | (300° C./300° C.) | 23.4 |
| Comparative Example 4 | Pt/YSZ (1 wt % Pt) | (300° C./300° C.) | 13.9 |

Referring to Examples 3, 5, and 6 shown in Table 2, the amount of CO chemisorbed in a maximum amount was substantially changed according to calcining and reducing temperatures. In addition, much more CO was chemisorbed onto the YSZ-supported Pt—Co catalyst (Example 1) than the YSZ-supported Pt catalyst (Comparative Example 4). Example 1 showed greater amount of CO chemisorbed than Examples 3 and 5, which may be due to higher platinum content and higher cobalt content.

A catalyst for oxidizing carbon monoxide according to the present invention shows higher reactivity even at low temperature than a conventional catalyst for oxidizing carbon monoxide, and does not cause any side reaction. Accordingly, the CO content in a fuel gas can be effectively reduced at a relatively low temperature using the catalyst according to the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel processor for a fuel cell, the fuel processor comprising a reformer and a preferential oxidation (PROX) reaction device downstream from the reformer, wherein the PROX reaction device includes a catalyst for oxidizing carbon monoxide comprising platinum and a transition metal supported by a support comprising a vacancy of oxygen, wherein the platinum and the transition metal exist in a bimetallic phase, wherein the support comprises yttrium stabilized $ZrO_2$ (YSZ) and the transition metal comprises cobalt.

2. The fuel processor of claim 1, wherein the catalyst for oxidizing carbon monoxide shows at least two peaks at 260° C. or lower when the catalyst for oxidizing carbon monoxide is analyzed using a temperature programmed reduction (TPR) analysis, wherein the TPR analysis is performed at a ramping rate of 10 K/min in a 10 volume % $H_2/Ar$.

3. The fuel processor of claim 1, wherein an atomic ratio of the transition metal to the platinum is in the range from about 5 to about 20.

4. The fuel processor of claim 3, wherein an atomic ratio of the transition metal to the platinum is in the range from about 10 to about 20.

5. The fuel processor of claim 3, wherein the amount of the platinum is in the range from about 0.2 wt % to about 1 wt % based on the total weight of the catalyst for oxidizing carbon monoxide.

6. The fuel processor of claim 5, wherein the amount of the platinum is in the range from about 0.5 wt % to about 1 wt % based on the total weight of the catalyst for oxidizing carbon monoxide.

7. The fuel processor of claim 1, further including at least one shift reaction device between the reformer and the PROX reaction device.

8. A fuel cell system comprising the fuel processor of claim 1.

* * * * *